United States Patent [19]
Goettl

[11] 3,913,345
[45] Oct. 21, 1975

[54] AIR CONDITIONER

[76] Inventor: William H. Goettl, 4717 N. Granite Reef Road, Scottsdale, Ariz. 85251

[22] Filed: Apr. 29, 1974

[21] Appl. No.: 465,297

[52] U.S. Cl. .................. 62/183; 62/305; 62/180; 62/181; 62/507; 62/171
[51] Int. Cl.² .......................................... F25D 39/04
[58] Field of Search ............ 62/171, 177, 178, 181, 62/182, 183, 184, 305

[56] References Cited
UNITED STATES PATENTS

| | | | |
|---|---|---|---|
| 2,323,511 | 7/1943 | Baker | 62/305 |
| 2,655,795 | 10/1953 | Dyer | 62/305 |
| 3,108,451 | 10/1963 | Clifford | 62/305 |
| 3,427,005 | 2/1969 | Kieykendall | 62/305 |

Primary Examiner—William J. Wye

[57] ABSTRACT

A combination air conditioner comprising a refrigeration type air conditioner and an evaporatively cooled type air conditioner wherein the evaporatively cooled air conditioner is spaced from the condenser of the refrigeration type air conditioner so as not to substantially interfere with air flow through said condenser normal to the operation of said refrigeration type air conditioner. The evaporative cooler so spaced from the condenser being adapted to deliver evaporatively cooled air to the condenser to augment thermal dynamic operation thereof. Additionally, the evaporative cooler is provided with means adapted to operate the fan thereof only without evaporative cooling, to augment operation of the condenser by increasing airflow therethrough. Control means for the evaporative cooler comprising a plurality of temperature responsive devices adapted to cause the fan of the evaporative cooler to force air towards said condenser at a plurality of different elevated temperatures and a further temperature responsive switch is also adapted to operate the pump of the evaporative cooler to deliver water to the evaporative cooler pads thereof for maximum augmentation of the condenser operation by the evaporative cooler.

7 Claims, 3 Drawing Figures

AIR CONDITIONER

BACKGROUND OF THE INVENTION

Various refrigeration air conditioners have utilized means for cooling the refrigerant condensers thereof as for example such condenser have been sprayed with water or have had evaporative cooler pads in contiguous relationship therewith and both of the foregoing means have cause minerals from the water to collect on the condenser and to thereby restrict air flow therethrough as well as to cause an insulating layer of minerals to be debilitating to the operation of the condenser. Additionally, the aforementioned evaporative cooler pad in contiguous relation with a refrigerant condenser causes restriction of air flow through the condenser and eventually the evaporative cooler pad is further restricted by the collection of minerals thereon all of which restricts air flow and relative heat exchange of the condenser due to the fact that the means for moving air through the condenser is aerodynamically limited by such restrictions.

It has been necessary to design refrigeration air conditioners to operate in an optimum relationship to a design temperature as for example 95° F. Under such ambient conditions, most refrigeration air conditioners operate most efficiently. Accordingly, it will be appreciated that the hereinbefore described prior art means for augmentation of the condenser operation has in many instances greatly reduced the efficiency and capacity of refrigeration air conditioners and particularly at extreme ambient temperature conditions.

SUMMARY OF THE INVENTION

The present invention comprises a refrigeration type air conditioner, the operation of which is augmented by an evaporative cooler type air conditioner which is sufficiently spaced from the condenser of the refrigeration type air condenser so as not substantially to interfere with normal air flow through said condenser in accordance with the operation of the means in the refrigeration air conditioner which moves air through the condenser. Thus the refrigeration condenser operation is not effected by failure or restricted operation of the evaporative cooler type air conditioner and accordingly the refrigeration type air conditioner may operate in accordance with its design temperature range without interference from the evaporative cooler air conditioner.

Additionally, the evaporative cooler air conditioner is provided with a fan adapted to augment air flow through the condenser such that the means which normally moves air through the condenser is augmented in its operation and the fan of the evaporative cooler type air conditioner is controlled by a plurality of temperature responsive devices which initially operate the evaporative cooler fan at a low speed and successively at a higher speed in accordance with elevated temperature conditions and finally at a relatively high ambient temperature condition another temperature responsive means energizes the water pump which starts water flowing through the evaporative cooler pads so that the evaporative cooler type air conditioner delivers evaporatively cooled air to the condenser of the refrigeration type air conditioner while at the same time air flow through the condenser is augmented by the fan of the evaporative cooler; thus at least three different ambient temperature conditions are responded by the evaporative cooler type air conditioner for augmenting flows through the condenser of the refrigeration type air conditioner and also finally to provide evaporatively cooled air at extremely high ambient temperature conditions, all of which greatly extends the efficiency and capacity range of the refrigeration type air conditioner and such augmentation thereof also conserves energy as compared to that which might be used by a refrigeration type air conditioner of sufficient capacity to handle the highest ambient temperature condition which the present invention is capable of handling.

Accordingly, it is an object of the present invention to provide a combination refrigeration and evaporatively cooled air conditioner wherein the evaporative cooler is substantially spaced from the condenser of the refrigeration type air conditioner so that there is no air flow restriction on the air conditioner fan which moves air through the condenser, whereby the motor operating the refrigeration air conditioner fan which moves air through the condenser may operate within its design heat range without danger of over heating.

Another object of the invention is to provide a combination refrigeration and evaporatively cooled air conditioner wherein the spacing of the evaporative cooler from the condenser of the refrigeration type air conditioner does not upset the critical balance and design condition of the refrigeration type air conditioner.

Another object of the invention is to provide a means for evaporatively cooling the condenser of the refrigeration type air conditioner without encountering the usual problems of minerals collecting on the condenser of the refrigeration type air conditioner whereby the condenser always remains clean and capable of optimum heat transfer characteristics as well as its capacity to permit maximum air flow therethrough.

Another object of the invention is to provide a combination refrigeration air conditioner and an evaporative cooler wherein the evaporative cooler is so spaced from the condenser of the refrigeration air conditioner condenser so that the refrigeration air conditioner may operate directly with outside atmosphere and at its designed condition even though the evaporative cooler pads become plugged due to the collection of minerals therein.

Another object of the invention is to provide a combination refrigeration and evaporative cooling air conditioner wherein temperature responsive controls are used as opposed to sensing heat and pressure which varies with different refrigeration air conditioners thereby providing positive control for the evaporative cooler portion of the air conditioner which delivers additional air flow and/or evaporative cooling to the condenser of the refrigeration air conditioner to augment operation of said condenser.

Another object of the invention is to provide a combination refrigeration and evaporatively cooled air conditioner wherein a novel control means is provided for operating the evaporative cooled portion of the air conditioner such that, at several different temperatures, it responds to augment air flow through the condenser of the refrigeration air conditioner as well as to finally augment such operation by evaporatiive cooling of the air delivered to said condenser.

Further objects and advantages of the invention may be apparent for the following specification, appended claims and accompanying drawings.

DESCRIPTION OF THE PREFERRED EMBODIMENTS

Figure 1:
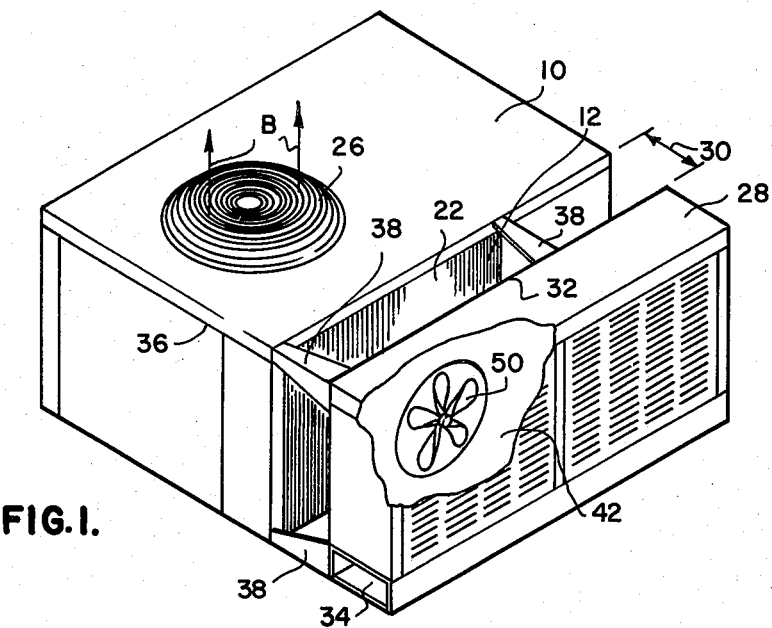
FIG. 1 is a perspective view of the air conditioner of the present invention, showing portions broken away to amplify the illustration.
Figure 3:
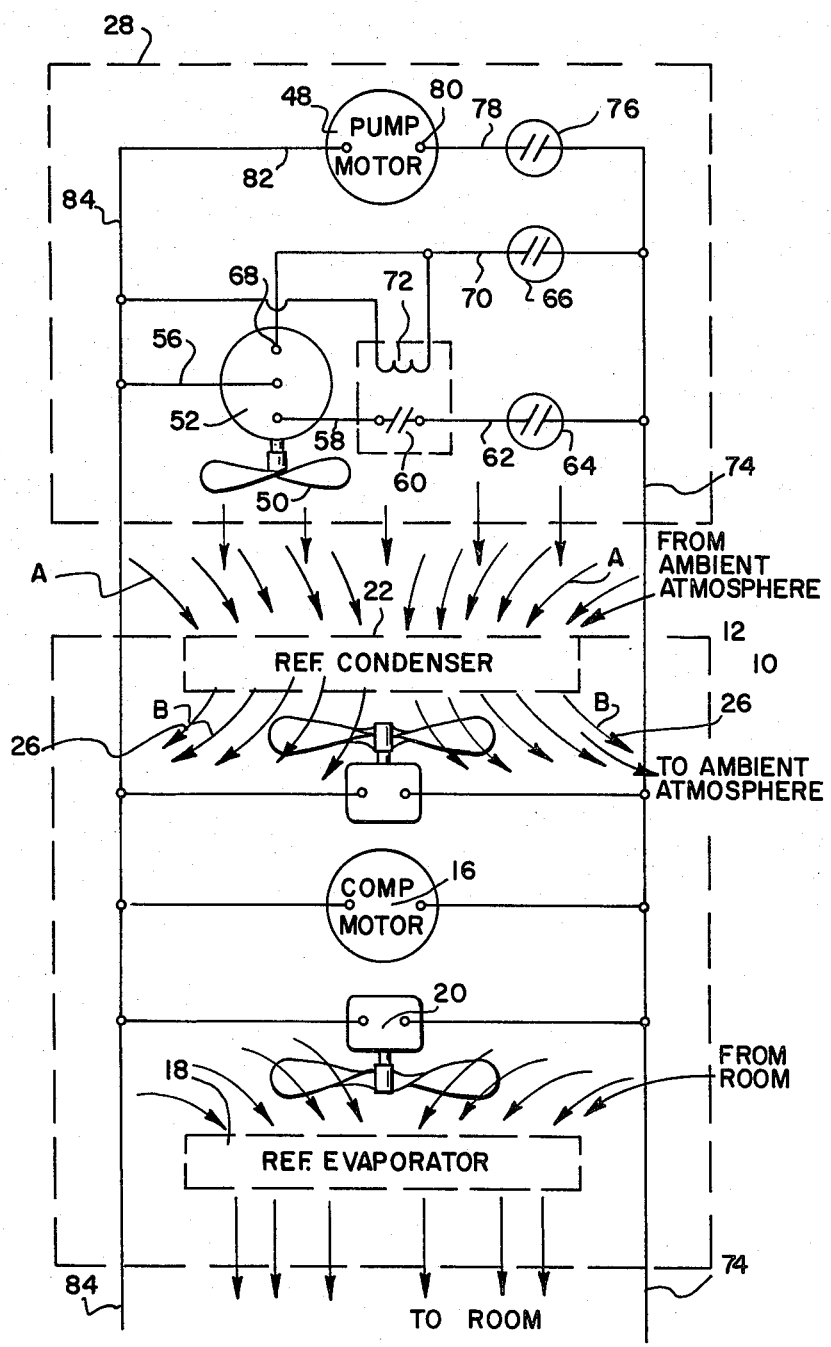
FIG. 3 is a diagrammatic view showing the electrical and control means of the invention as well as the related functional, mechanical and thermodynamic components thereof.

As shown in FIG. 1, a substantially conventional refrigeration air conditioner 10 is provided as shown in FIG. 3 of the drawings, with a refrigerant condenser 12, a fan 14 for causing air to flow through the condenser; a conventional refrigerant compressor 16, which is coupled to the condenser 12 and to a conventional refrigerant evaporator 18 by the usual tubular plumbing so as that used for freon or other similar refrigerants.

A motor-driven fan 20 is disposed to cause air to flow through the evaporator 18 in the conventional manner.

The refrigerant condenser 12 is provided with an inlet 22 communicating with outside ambient atmosphere and an outlet 24 the refrigeration air conditioner 10 is provided with a housing having an ambient air outlet 26 adapted to release air to ambient at the outlet side 24 of the condenser which air is forced therethrough by the fan 14.

It will be seen that the invention as shown in FIG. 1 comprises an evaporative cooler type air conditioner 28 which is spaced from the condenser 12 a distance as shown at 30 and as an example, this distance may be approximately 12 inches for normal air conditioners of the type disclosed in FIG. 1, so as not to interfere with normal air flow as indicated by arrows A in FIG. 3 of the drawings. The arrows A indicating the flow of outside ambient atmosphere to the inlet 22 of said condenser, between the outlet side 32 of the evaporative cooler 28, and the inlet 22 of the condenser 24, all as indicated by arrows A in FIG. 3 of the drawings. Thus, the spacing at 30, as shown in FIG. 1, is sufficient so as to allow normal flow or air from the inlet 22 of the condenser 12 to the outlet 24, as caused by the fan 14.

The evaporative cooler air conditioner is provided with a housing 34 which is secured to a housing 36 of the refrigeration air conditioner 10 by means of legs 38. Thus the evaporative cooler 28 is supported in juxtaposition relative to the condenser 12 and in spaced relation therefrom. This spacing provided by the legs 38 permits the inlet 22 of the refrigerant condenser to communicate with outside ambient atmosphere. The evaporative cooler 28 is disposed to deliver augmentation air flow to the condenser 12 as well as evaporatively cooled air which also augments the flow through the condenser 12, and/or augments the operation of the fan 14 which forces air through the condenser 12 from its inlet 22 to its outlet 24. It will be seen that air exhausted from the outlet 24 of the condenser 12 passes through the outlet 26 as shown by the arrows B in FIGS. 1 and 3 of the drawings.

The evaporative cooler 28 is provided with a water sump 40 in the lower portion of the housing 34 thereof, and disposed above the sump 40 is an evaporative cooler pad structure 42 having a water trough 44 at the upper portion thereof, adapted to receive water through a conduit 46 from a pump 48 which is disposed in the sump 40 in communication with water therein.

The pump 48 when energized delivers water through the conduit 46 to the trough 44 which distributes water uniformly through the pad 42 and the remaining water drains back into the sump 40.

A fan 50 is operated by a motor 52 in the evaporative cooler housing 34, and the motor 52 is supported by a bracket 54 in said housing.

The fan 50 when driven by the motor 52, causes air to move as indicated by Arrows C from outside ambient atmosphere through the evaporative cooler pad 42 and to be delivered through a fan outlet grill 54 toward the refrigeration air conditioner condenser 12.

Figure 2:
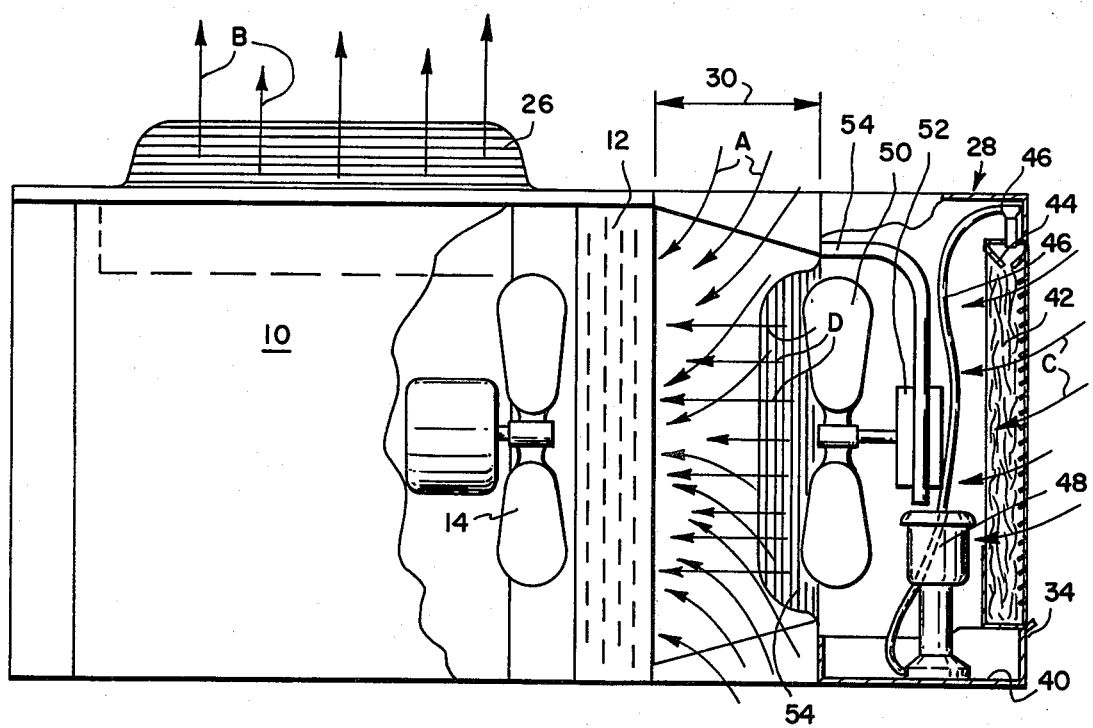
FIG. 2 is an enlarged side elevational view of the air conditioner of the invention showing portions broken away and in sections to amplify the illustration.

The air delivered by the fan 50 is indicated by arrows D in FIG. 2 of the drawings, and air moved by the aforementioned fan 14 of the refrigeration air conditioner 10 is indicated by arrows A in FIG. 2 of the drawings. Thus the air delivered by the fan 52 indicated by arrows D, augments the flow of air indicated by the arrows A, which the fan 14 moves through the condenser 12.

The combined flow of air indicated by the arrows A and D passes outward through the outlet 26 of the refrigeration air conditioner as indicated by arrows B in FIG. 2 of the drawings.

The optimum design condition of the refrigeration air conditioner 10, by way of example, may be 95° F which is usually an ideal design temperature.

At this temperature the refrigeration air conditioner 10 operates at its greatest efficiency and it may operate in this manner without any function of the evaporative cooler 28 due to the fact that the spacing as indicated at 30 in FIG. 1 of the drawings is sufficient to allow normal air flow from outside ambient atmosphere through the condenser 12 as may be caused by the fan 14 only of the refrigeration air conditioner 10.

As shown in FIG. 3 of the drawings, the motor 52 which operates the fan 50 of the evaporative cooler 28 is a two-speed motor energizable at low speed through electrical conductors 56 and 58. The conductor 58 being coupled through a normally closed relay 60 to a conductor 62 which is energized through a temperature responsive switch 64 which, as for example, may close at 98° F and this switch operates within a differential of about 2° closing on a rising temperature and opening on a reduction of temperature.

When this temperature responsive switch 64 closes, it energizes the fan motor 52 at low speed thereby forcing air toward the refrigerant condenser 12 to augment air flow therethrough as may be induced by operation of the fan 14.

It will be understood that the operation of the fan 50 may cause 300 cubic feet per minute of additional air flow through the condenser as an example of operation and thus augmentation of the operation of the fan 14 is substantial when the temperature sensing switch 64 closes and energizes the fan motor 52 at low speed.

A second temperature responsive switch 66 is coupled to a terminal 68 of the motor 52 and this switch 66 through a conductor 70, and the terminal 68 energizes the motor 52 at high speed. Concurrently a coil 72 of the relay 60 opens the normally closed relay to thereby disconnect the conductor 58 from the conductor 74 of a power source.

With the fan motor 52 energized through the conductor 56 and 70 the motor is operated at high speed and augments air flow through the condenser 12, as for example, an additional 700 cubic feet per minute is induced to flow through the condenser 12 and this augments operation of the fan 14 to a greater extent than when the fan 50 is operated at low speed.

A third temperature responsive switch 76 is coupled with the power source line 74 and with a conductor 78 which is coupled to a terminal 80 of the pump motor 48.

The pump motor 48, by means of a conductor 82, is coupled to a second conductor of the power source designed 84 and the pump 48 is thereby energized with operation of the temperature responsive switch 76 which is adapted to close at approximately 105° F, while the fan motor remains energized through the temperature responsive switch 66 thus operating at high speed to induce the aforementioned 700 cubic feet per minute of air flow in addition to causing evaporative cooling due to flow of water through the pad 42 which evaporatively cools the air delivered as indicated by arrows D, thus further augmenting the thermaldynamic operation of the condenser 12. Thus, in this condition the additional air flow together with evaporative cooling, provides substantial flow of air increase over the condenser as well as the delivery of such air at about 95° F due to evaporative cooling of the air from the ambient temperature of 105°down to 95° F.

All of the temperature responsive switches 64, 66 and 76 operate on a differential of about 2° such that they close on a rise of temperature and open on a reduction of ambient temperature. Thus these switches sense the temperature of the ambient atmosphere and control the various stages of the operation of the evaporative cooler 28 while the refrigeration condenser is augmented in its thermaldynamic operation without restricting the normal flow of air therethrough as may be caused by the fan 14.

It will be seen that due to the spacing of the evaporative cooler 28 from the condenser 12 that water in the evaporative cooler pad 42 cannot enter the condenser 12 so as to cause a collection of minerals thereon. Furthermore, the evaporative cooler pad 42 is remote from the condenser 12 so that it does not cause any air flow restriction due to the spacing as indicated at 30 in FIG. 1 of the drawings, and also due to the fact that the evaporative cooler is even more remotely located from the space indicated at 30 as shown best in FIG. 2 of the drawings.

It will be appreciated that the operation of the evaporative cooler 28 may only be needed under high ambient temperature conditions and therefore may be used only a portion of the season during which the refrigeration air conditioner 10 is operated and additionally, the cost of operating the evaporative cooler 28 is normally lower than a comparable refrigeration air conditioner, therefore the augmentation of the thermal-dynamic capacity of the refrigeration air conditioner 10 is greatly augmented in a very economical way due to the fact that the evaporative cooler 28 is operated only a portion of the season and also due to the fact that it is basically a very economical air cooling device.

It will therefore be appreciated by those skilled in the art that the air conditioner of the present invention is capable of conserving a substantial amount of electrical energy in proportion to its overall seasonal service capacity.

It will be obvious to those skilled in the art that various modifications may be made without departing from the spirit of the invention.

I claim:

1. In a combination air conditioner, a refrigeration-type air conditioner having a refrigerant condenser, said refrigerant condenser provided with an inlet and an outlet; a refrigerant evaporator; a refrigerant vapor compressor coupled with said condenser and evaporator; said inlet of said refrigerant condenser communicating with outside ambient atmosphere; first means for forcing ambient air from atmosphere through said condenser from said refrigerant condenser inlet to said refrigerant condenser outlet and exhausting said ambient air to atmosphere; an evaporative type air cooler having an evaporative cooler pad; pump means for delivering water to said pad; second means for forcing air from ambient atmosphere through said pad and for delivering air toward said inlet of said refrigerant condenser for augmenting operation of said first means to thereby increase air flow through said refrigerant condenser; said evaporative type air cooler and said second means spaced from said refrigerant condenser a distance so as not substantially to interfere with normal ambient air flow through said refrigerant condenser as may be forced therethrough by said first means.

2. The invention as defined in claim 1 wherein said refrigeration type air conditioner is adapted for optimum performance at a designed temperature; and temperature responsive means coupled with and adapted to control operation of said second means of said evaporative type air conditioner; said temperature responsive means adapted to respond to an elevated temperature above said design temperature and to thereby energize said second means to deliver additional air toward said condenser to thereby increase air flow therethrough and to augment operation of said first means.

3. The invention as defined in claim 2 wherein second temperature responsive means is adapted to respond to a further elevated temperature above said first mentioned elevated temperature; said second temperature responsive means adapted to energize said second means at a higher rate to further increase flow toward said condenser and to thereby further augment operation of said first means.

4. The invention as defined in claim 3 wherein third temperature responsive means is adapted to energize said pump means to cause water to be delivered to said evaporative cooler pad and to thereby cause said evaporative cooler to deliver evaporatively cooled air toward said condenser to further augment operation thereof.

5. The invention as defined in claim 1 wherein temperature responsive means is adapted to respond to a temperature above said design temperature; said temperature responsive means coupled to and adapted to energize said evaporative cooler type air conditioner for delivering evaporative cooled air to said inlet of said condenser for augmenting the operation thereof.

6. A combination air conditioner comprising an air-to-air refrigeration unit having a condenser communicating with ambient outside atmosphere; means for moving air through said condenser; and an evaporative cooler spaced from said condenser and adapted to deliver evaporatively cooled air to said condenser; said evaporative cooler spaced from said condenser a sufficient distance so as not substantially to interfere with normal outside ambient air flow through said condenser in accordance with the operation of said means.

7. A combination air conditioner comprising an air-to-air refrigeration unit having a condenser communicating with outside atmosphere; means for moving air through said condenser; and an evaporative cooler spaced from said condenser and adapted to deliver air to augment air flow moved through said condenser by said means; said evaporative cooler spaced from said condenser a sufficient distance so as not to substantially interfere with normal flow of outside ambient atmosphere through said condenser in accordance with the operation of said means.

* * * * *